T. C. KNOWLES & J. P. DERDEN.
BALE HOOP TIGHTENERS.
No. 181,949. Patented Sept. 5, 1876.
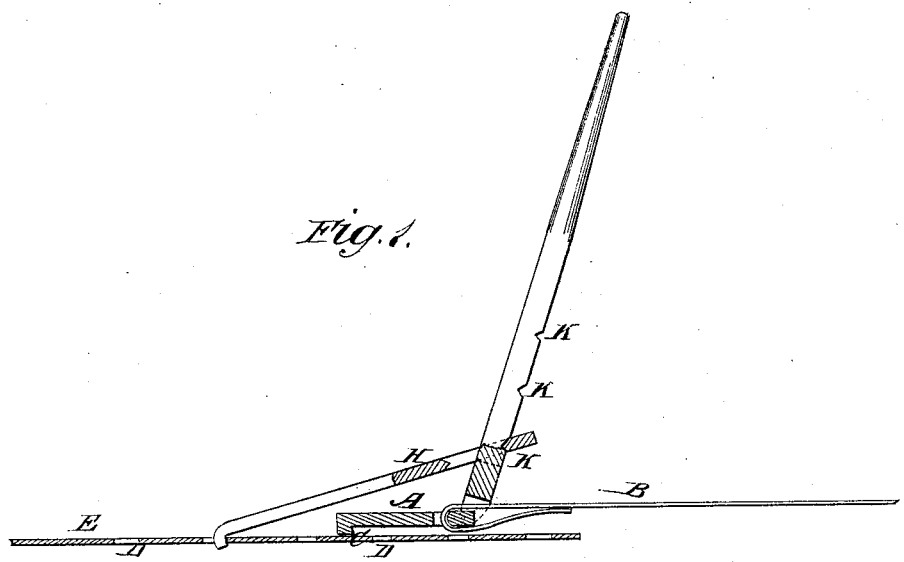
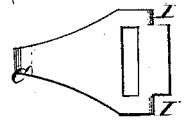
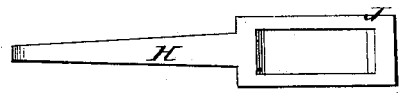
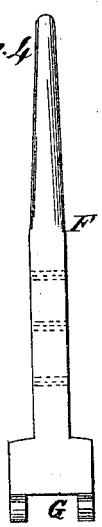
WITNESSES:
Francis McArdle
John Goethals
INVENTOR:
T. C. Knowles
J. P. Derden
BY Munn & Co
ATTORNEYS.

UNITED STATES PATENT OFFICE.

THOMAS C. KNOWLES AND JAMES P. DERDEN, OF VIENNA, LOUISIANA.

IMPROVEMENT IN BALE-HOOP TIGHTENERS.

Specification forming part of Letters Patent No. 181,949, dated September 5, 1876; application filed May 9, 1876.

*To all whom it may concern:*

Be it known that we, THOMAS CRAWFORD KNOWLES and JAMES PATTERSON DERDEN, of Vienna, in the county of Lincoln and State of Louisiana, have invented a new and Improved Bale-Hoop Tightener, of which the following is a specification:

Our invention consists of a claw-lever and a hook, to be employed for stretching together the ends of a bale-hoop, for so tightening them around the bale that, being applied and the hoop fastened while the bale is under the follower, it will not stretch when the pressure by the follower is relaxed.

Figure 1 is a sectional elevation of our improved bale-hoop tightener, and a section of one of the ends of the hoop. Fig. 2 is a plan of the hook by which the bale-tie is fastened. Fig. 3 is a plan of the hook of the tightener, and Fig. 4 is an elevation of the claw-lever for working the hooks.

The tie-fastening hook A is fastened in the end of the part B, and hooks by its hook end C in one of the holes D of the other part E of the hoop.

To strain the hook around the bale, and fasten it sufficiently tight to prevent the bale from expanding when it is relieved of the pressure of the follower, we propose to employ a lever, F, with a forked claw, G, and a hook, H, the former to engage the hook A behind its shoulders I, and the latter to engage in one of the holes of part E and draw them together, in the manner indicated in Fig. 1, and the hook being connected to the lever, so that it can be shifted toward and from the claw end as the resistance varies. This connection is preferably made by a yoked end, J, of the hook, in which the lever is slipped, so that it drops into the notches K, to be held the required distance from the end.

Having thus described our invention, what we claim as new, and desire to secure by Letters Patent, is—

A bale-hoop tightener consisting of notched lever F, having forked claw G, and hook H, having yoke J, substantially as and for the purpose specified.

THOMAS CRAWFORD KNOWLES.
JAMES PATTERSON DERDEN.

Witnesses:
M. A. HENRY,
W. J. DOFFIN.